United States Patent [19]
Quinn

[11] Patent Number: 5,559,527
[45] Date of Patent: Sep. 24, 1996

[54] METHOD AND APPARATUS FOR DISPLAYING PERFORMANCE METRICS IN A COMMUNICATION SYSTEM

[75] Inventor: Robert Quinn, Wheeling, Ill.

[73] Assignee: Motorola, Inc., Schaumburg, Ill.

[21] Appl. No.: 385,210

[22] Filed: Feb. 7, 1995

Related U.S. Application Data

[63] Continuation of Ser. No. 24,048, Mar. 1, 1993, abandoned.

[51] Int. Cl.$^6$ .............................. G09G 5/00; H04B 17/00
[52] U.S. Cl. ...................... 345/115; 345/902; 455/33.1; 455/67.7; 379/59; 379/136
[58] Field of Search ............................. 379/96, 59–122, 379/201, 45, 354, 221; 340/722, 990, 995, 525, 539; 358/404, 468; 455/33.1, 56.1, 53.1, 67.1, 67.7, 67.2, 67.3, 67.4, 67.5, 67.6, 226.4; 364/551.01; 395/155, 156, 160, 161; 370/17

[56] References Cited

U.S. PATENT DOCUMENTS

| | | | |
|---|---|---|---|
| 4,845,745 | 7/1989 | Havel ..................................... | 379/354 |
| 4,926,497 | 5/1990 | Shirley, Jr. et al. .................. | 455/67.1 |
| 4,942,540 | 7/1990 | Black et al. .............................. | 379/96 |
| 4,964,065 | 10/1990 | Hicks et al. ............................ | 455/67.7 |
| 5,023,900 | 6/1991 | Tayloe et al. .............................. | 379/59 |
| 5,055,851 | 10/1991 | Sheffer .................................... | 340/539 |
| 5,109,397 | 4/1992 | Thompson ................................ | 379/45 |
| 5,134,709 | 7/1992 | Bi et al. .................................... | 379/59 |
| 5,230,078 | 7/1993 | Varela et al. .......................... | 456/67.1 |
| 5,241,302 | 8/1993 | Thong ..................................... | 340/722 |
| 5,276,789 | 1/1994 | Besaw et al. ........................... | 395/160 |
| 5,295,244 | 3/1994 | Dev et al. ................................ | 395/160 |

*Primary Examiner*—Richard Hjerpe
*Assistant Examiner*—Kara Farnandez Stoll
*Attorney, Agent, or Firm*—Heather L. Creps

[57] ABSTRACT

A method and apparatus of displaying performance metrics of a cellular communication system (50) having a call routing element (51), control elements (55, 56, 57, 58) and transceiver elements (59, 60, 61, 62, 63) provides for creating a hierarchical display (10) of the call routing element, the control elements and the plurality of transceiver elements with the call routing element depicted at a center of the hierarchical display and the control elements and transceiver elements radiating outwardly from the center in a hierarchical order. The user or the system selects a performance metric of one of the call routing element, the control elements and the transceiver elements, and the selected performance metric is displayed for each of the call routing element, the control element and the transceiver elements within the hierarchical display.

19 Claims, 1 Drawing Sheet

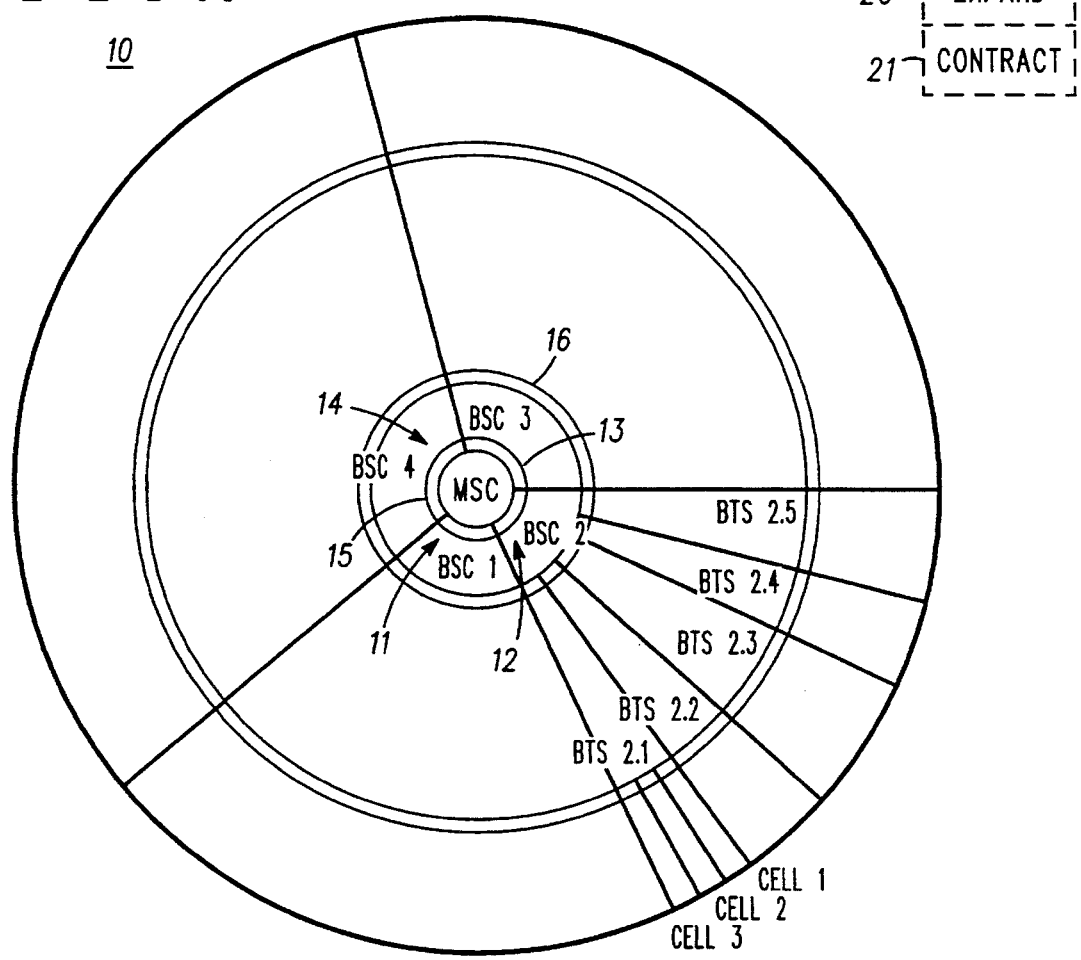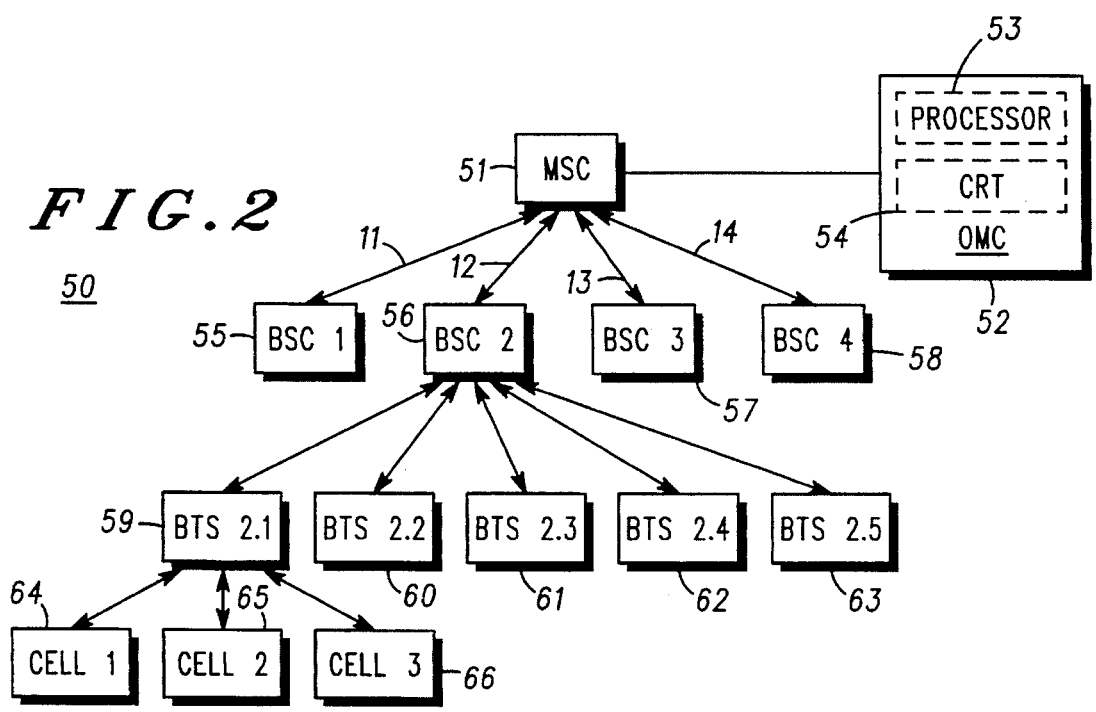

METHOD AND APPARATUS FOR DISPLAYING PERFORMANCE METRICS IN A COMMUNICATION SYSTEM

This application is a Continuation of application Ser. No. 08/024,048, filed Mar. 1, 1993, now abandoned.

FIELD OF THE INVENTION

The field of the invention relates to cellular communication systems and specifically to an operator interface to a cellular communication system.

BACKGROUND OF THE INVENTION

Cellular communication systems and operator interfaces to such systems are known. Operator interfaces within a cellular system are typically provided at a cellular operations and maintenance center (OMC) for purposes of system monitoring, load equalization, detection of cell failures, and maintaining overall system efficiency.

Monitoring of the cellular system has added importance where the element monitored is a base transceiver station (BTS) located remotely from the OMC or in difficult terrain. Failure of a BTS may cause surrounding BTSs, remaining on-line, to be overloaded with calls both from the service area of the failed BTS but also from calls within the areas of the remaining on-line BTSs. Overloading of remaining cells can reduce efficiency by delaying call processing, handoffs, or responses to call requests.

Delayed responses to call requests often result in the call request being re-transmitted, further overloading the system. Delays in handoffs may result in dropped calls. Delaying call processing may contribute to both re-transmitted call requests or dropped calls.

Features monitored at a BTS by a system operator located at the OMC may include cell loading (calls in progress), handoffs, dropped calls, call requests, and call rejections. Dropped calls may be monitored at the BTS to detect problems with a BTS's handoff parameters. Excessive handoff, on the other hand, may also indicate a problem with handoff parameters or signal measuring devices associated with handoff.

Excessive loading at a BTS may be corrected by a system operator located at the OMC by manual intervention to modify the handoff parameters, thereby handing off some of the calls of an overloaded cell to a surrounding cell. Equipment failures detected by the system operator may be corrected by dispatching repair personnel or downloading software to a malfunctioning BTS.

Other features monitored by the operator at the OMC are the operation of communication links between the BTSs and mobile switching center (MSC). An MSC, as is known, serves the function of routing calls among BTSs or between a BTS and public switch telephone network (PSTN). The communication links between a BTS and MSC serves the function of exchanging voice and control information between the BTS and MSC. Exchange of control information between BTS and MSC may be accomplished by dedicated control channels or by channel associated signalling within the communication links.

Monitoring of communication links by the OMC is important both for effective control of the BTS by the MSC but also to ensure that overloading does not lead to additional dropped calls or processing delays caused by varying control traffic.

Operator interfaces at the OMC have traditionally been provided by pull-down menus and text displays. Relative position of the source of the displayed data within a communication system is typically provided by system markers included with the display, providing an identification of a cell or subsystem within the communication system. System markings within textual displays do not provide a clear, easily understandable, presentation of functional location within a hierarchy of the communication system. Because of the importance of cellular communications a need exists for a more effective method of displaying system information that is not dependent on system markers for an indication of functional position within the cellular system hierarchy.

SUMMARY OF THE INVENTION

A method and apparatus of displaying performance metrics of a cellular communication system having a call routing element, control elements and transceiver elements provides for creating a hierarchical display of the call routing element, the control elements and the plurality of transceiver elements with the call routing element depicted at a center of the hierarchical display and the control elements and transceiver elements radiating outwardly from the center in a hierarchical order. The user or the system selects a performance metric of one of the call routing element, the control elements and the transceiver elements, and the selected performance metric is displayed for each of the call routing element, the control element and the transceiver elements within the hierarchical display.

BRIEF DESCRIPTION OF THE DRAWINGS

FIG. 1 is a graphical display in accordance with one embodiment of the invention.

FIG. 2 is a display of a cellular system and operations and maintenance center in accordance with one embodiment of the invention.

DETAILED DESCRIPTION OF THE PREFERRED EMBODIMENT

The solution to the problem of displaying cellular operational information lies, conceptually, in a graphical display with a selected cellular element at a center and subordinated elements radiating from the center in a hierarchical order. The use of the center element and hierarchical ordering of elements around the center provides a system operator with a visual indication of element relationships without reliance on system markers. Within the hierarchical display an alarm may be displayed by a flashing element. An indication of a status of a performance metric (e.g., system loading, processor utilization, link utilization, or transcoder and traffic channel loading) can be displayed within the hierarchical display as a color value (or grey scale) within each displayed element of the hierarchical display.

FIG. 1 is a hierarchical display 10 of a cellular system (FIG. 2) 50 that may be displayed on a cathode ray tube (CRT) 54 located at the OMC 52 in accordance with one embodiment of the invention. Such a display 10 may be created on a CRT 54, such as a IBM PC-AT, using off-the-shelf software such as Turbo Pascal available from Borland International, of Scotts Valley, Calif., using a subroutine called "Pie Slice".

Included within the cellular display 10 is a center element MSC for indicating the status of the MSC 51 of the cellular system. Surrounding the center element MSC are other elements of the cellular system radiating from the center in hierarchical order. Nearest the center element MSC is, at least, a second group of peer elements BSC1–BSC4 indicating the status of base site controllers (BSCs) 55–58 of the cellular system. Elements BSC1 to BSC4 are bounded by a set of concentric circles containing the peer group. Individual elements BSC1–BSC4 within the peer group are in turn divided by line segments radiating from the center.

Separating the second group of elements BSC1–BSC4 from the center element MSC is a narrow band 15 formed by another set of concentric circles. The band 15 is divided by line segments, radiating from the center, into elements 11–14 indicating (e.g., by color, grey scale, or by flashing the element) the status of communication links between the MSC and each of the second group of elements BSC1–BSC4.

In a similar manner element BSC2 of the hierarchical display 10 radiates into BTS2.1–2.5 with a third narrow band 16, separating BSC2 and BTS2.1–2.5, for indicating the status of communication links between BSC2 and each of the BTSs BTS2.1–BTS2.5. BTS2.1, likewise, radiates into interconnected cells Cell1–Cell3 with a third narrow band for indication of status of communication links between BTS2.1 and each of the cells Cell1–Cell3.

In one embodiment of the invention fault conditions within the cellular system are indicated within the hierarchical display 10 by causing the element associated with the fault to begin flashing. For example, a fault condition at the MSC (e.g., overheating of a radio rack or shutdown of a power supply within the radio rack) would cause the center element MSC of the hierarchical display 10 to begin flashing. Likewise, a fault within the second group of elements (e.g., BSC4) would cause the effected element BSC4 to begin flashing.

Upon indication of an alarm within the hierarchical display 10 an operator of the OMC 52 may select the flashing element (e.g., clicking a mouse on the element) for further information. Information may then be displayed at the bottom of the screen identifying the subelement providing the alarm indication.

In another embodiment of the invention a performance metric (e.g., system loading, processor utilization, link utilization, or transcoder and traffic channel loading) of the communication system 50 is displayed within the hierarchical display 10 as a color value with each element displaying the color value of that element. The color value displayed within an element is determined by normalizing a measured magnitude of the performance metric of the element with a maximum value for the element, expressed as a percentage, and converted into a continuous color value from blue to red with blue representing zero percent and red representing one-hundred percent.

Some performance metrics (e.g., processor utilization and link utilization) may be selected together (since each metric is associated with different element combinations) and displayed within the same hierarchical display 10. Other performance metrics such as system loading would be selected individually since system loading would generate a color value for each element of the hierarchical display 10.

Selection of a performance metric may be performed through use of a pull-down menu or by clicking on a displayed option menu. An indication of the selected performance metric would then be displayed above the hierarchical display 10 as indication of the source of the displayed data.

In another embodiment of the invention performance metrics of each element of the cellular system 50 are compared with respective threshold values and alarm conditions determined based upon such comparison. Alarm conditions, in such case, are displayed within a separate hierarchical display 10 dedicated to alarm conditions or by flashing the element associated with the alarm condition.

An example of an alarm condition based upon performance metric may be the communication link 12 interconnecting the MSC and BSC2. During operation of the cellular system 50 a processor 53 within the OMC 52 continually gathers and correlates data relative to performance metrics, such as the number of in-progress calls through communication link 12. Such correlated data is compared with performance thresholds within the processor for a determination of an alarm condition. In the case of an overload within the communication link 12, the associated element 12 of the hierarchical display 10 would begin flashing.

In another embodiment of the invention the hierarchical display 10 may be adjusted to allow for the display of additional information. Under such an embodiment an element may be selected in conjunction with the Expand box 20 or Contract box 21 to change the relative positions of elements within the hierarchical display 10. If the Expand box 20 were selected along with BSC2, then the hierarchical display 10 would be modified such that BSC2 would occupy the center element and other elements below BSC2 in the hierarchical order would be radially displayed around the center element. Such a selection would allow for the display of the condition of individual transceivers at each of the Cells 1–3 within the outside band of the hierarchical display 10. Conditions examined at the transceiver level may be, for example within a time division multiple (TDM) system, the number of calls being handled by a particular transceiver. The operator, after examining the conditions of the transceivers, may return to the original display by selecting the Contract box 21.

Use of the hierarchical display 10 beneficially allows a system operator to view system functions on a relative basis with little or no familiarity with system operation. The ease of identifying system faults and of expanding displayed data in areas with detected faults increases operator efficiency and reduces potential downtime associated with such faults. The hierarchical display 10 may also be used as a planning tool allowing a system operator to monitor system parameters during peak load periods without interfering with normal system functions.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., tiling displays within the same CRT), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

I claim:

1. An apparatus for displaying performance metrics of a wireless cellular communication system having a mobile switching center, and a plurality of base site controllers comprising:

a hierarchical display of the mobile switching center and the plurality of base site controllers, the mobile switching center depicted at a center of the hierarchical display and the base site controllers radiating outwardly from the center in a hierarchical order;

means for selecting a performance metric of one of the mobile switching center and the plurality of base site controllers; and means for displaying the performance metric for the mobile switching center or the plurality of base site controllers within the hierarchical display.

2. The apparatus of claim 1 wherein the means for displaying the performance metric is operable for displaying the performance metric as a color value.

3. The apparatus of claim 1 wherein the means for displaying the performance metric is operable for displaying the performance metric as a gray scale.

4. The apparatus of claim 1 further comprising means for locating concentric rings around the mobile switching center and the plurality of base site controllers such that the plurality of base site controllers are located between adjacent concentric rings.

5. The apparatus of claim 4 further comprising means for dividing the base site controllers by line segments radiating from the center.

6. The apparatus of claim 1 further comprising means for comparing the performance metric with a threshold value and upon the event of the performance metric exceeding the threshold determining that an alarm condition exists.

7. The apparatus of claim 6 further comprising means for flashing a color value when the alarm condition exists.

8. The apparatus of claim 1 wherein the wireless cellular communication system further comprises a plurality of control elements, each of the plurality of control elements being subordinate to the mobile switching center and superior to an associated sub-group of the plurality of base site controllers, the apparatus further comprising:

means for depicting each of the plurality of control elements on the hierarchical display radiating outwardly from the mobile switching center in hierarchical order; and means for depicting the sub-group of the plurality of base site controllers radiating outwardly from the associated one of the plurality of control elements.

9. The apparatus of claim 8 further comprising means for locating concentric rings around the mobile switching center, the plurality of control elements and the plurality of base site controllers such that the plurality of control elements are located between a first set of adjacent concentric rings and the plurality of base site controllers are located between a second set of adjacent concentric rings.

10. The apparatus of claim 8 further comprising:

means for selecting a first of the plurality of control elements; and means for reformatting the hierarchical display with the first of the plurality of control elements positioned at the center and the associated sub-group of the plurality of base site controllers radiating from the first of the plurality of control elements in a hierarchical order.

11. A method of displaying performance metrics for a cellular communication system having at least a mobile switching center and a plurality of base site controllers, the method comprising the steps of:

creating a hierarchical display with the mobile switching center depicted at a center of the hierarchical display and the plurality of base site controllers radiating outwardly from the center in a hierarchical order;

selecting a performance metric of one of the mobile switching center and the plurality of base site controllers; and displaying the performance metric for the mobile switching center or the base site controllers within the hierarchical display.

12. The method of claim 11 wherein the step of displaying the performance metric further comprises displaying the performance metric as a color value.

13. The method of claim 11 wherein the step of displaying the performance metric further comprises displaying the performance metric as a gray scale.

14. The method of claim 11 further comprising the step of locating concentric rings around the mobile switching center and the plurality of base site controllers such that the plurality of base site controllers are located between adjacent concentric rings.

15. The method of claim 14 further comprising the step of dividing the plurality of base site controllers by line segments radiating from the center.

16. The method of claim 11 further comprising the step of comparing the performance metric with a threshold value and upon the event of the performance metric exceeding the threshold determining that an alarm condition exists.

17. The method of claim 16 further comprising the step of flashing a color value when the alarm condition exists.

18. The method of claim 11 wherein the cellular communication system further comprises a plurality of base site transceivers, the method further comprising the step of:

depicting the base site transceivers on the hierarchical display extending radially outwardly from the center and the base site controllers.

19. The method of claim 11 wherein the cellular communication system further comprises a plurality of base site transceivers associated with a first of the plurality of base site controllers, the method further comprising the step of:

selecting the first of the plurality of base site controllers; and reformatting the hierarchical display with the first of the plurality of base site controllers positioned at the center and the base site transceivers radiating from the center in a hierarchical order.

* * * * *